J. L. POPE.
Composition of Matter.
No. 226,547.  Patented April 13, 1880.
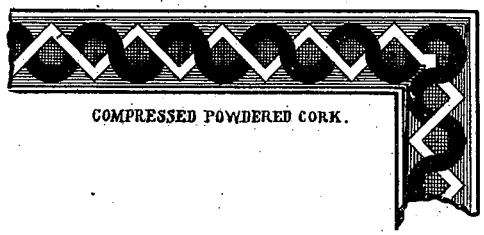
COMPRESSED POWDERED CORK.
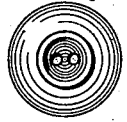
THIS IS A BUTTON
COMPOSED OF
COMPRESSED POWDERED CORK.
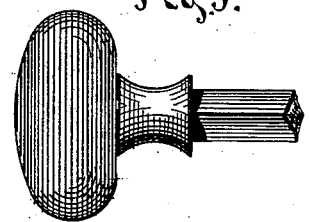
COMPRESSED POWDERED CORK.
WITNESSES
Frank M. Faber
Willard Fracker
INVENTOR
John L. Pope
By Liggett & Liggett ATTORNEYS

UNITED STATES PATENT OFFICE.

JOHN L. POPE, OF CLEVELAND, OHIO.

COMPOSITION OF MATTER.

SPECIFICATION forming part of Letters Patent No. 226,547, dated April 13, 1880.

Application filed October 6, 1879.

*To all whom it may concern:*

Be it known that I, JOHN L. POPE, of Cleveland, in the county of Cuyahoga and State of Ohio, have invented certain new and useful Improvements in Composition of Matter; and I do hereby declare the following to be a full, clear, and exact description of the invention, such as will enable others skilled in the art to which it pertains to make and use it, reference being had to the accompanying drawings, which form part of this specification.

My invention relates to a substance or mass suitable for making tiling, flooring, wall-covering, and all the various implements and devices at present made from gutta-percha or celluloid; and it consists of cork, (colored or not,) first pulverized or reduced to an impalpable powder, then mixed with a suitable binder, and afterward pressed to a solid consistency, the degree of solidity depending upon the pressure applied.

In carrying out my invention I do not limit myself to any specific *modus operandi*, or to any exact proportion of parts as respects the ingredients constituting the mass, or to the employment of any particular binder. In forming this substance or mass, which constitutes, broadly, my invention, I take cork and pulverize it by grinding and bolting until it is reduced to an impalpable powder. If the article to be made needs to be colored, a suitable pigment or coloring agent is applied to the cork in its powdered state. A suitable binder is then mixed with the pulverized cork and the mass is pressed to any desired shape or solidity.

While an indefinite variety of binders may be found useful, the one which I have found by experiment to be effective would be the following: Take of Canada balsam, one part; of a saturated alcoholic solution of shellac, three parts; and of collodion, six parts. Of this mixture take, say, two fluid ounces to a pint of pulverized cork. I have named this binder and these proportions simply as one of an indefinite number and variety that may be employed.

Before pressing it is necessary to stir the mass until nearly dried—that is, until the more volatile portions of the binder have evaporated.

When a very light-colored product is wanted, or when delicate tints of color are to be applied, the cork should be bleached, and when thus bleached it is susceptible of taking the most delicate tints with very beautiful effect.

I am aware that cork and gutta-percha or rubber have been mixed together; but such compositions are not only different in character, but have been employed for purposes bearing no analogy to the uses for which my substance is adapted.

I am also aware that cork has been granulated and united with a binder and used in the manufacture of floor-covering.

I am also aware that scraps of cork left from the manufacture of cork stoppers have been united together as a cheap substitute for cork in the use of life-preservers and the like.

I am not aware, however, that cork has ever before been pulverized or reduced to an impalpable powder, and, without the addition of any other substance, (unless it be a coloring-matter,) been mixed with a binder and pressed to a solid mass. Thus pulverized, pressed, and reduced in bulk, a radically new product is the result, and in the pulverized state only can cork be effectually colored.

It is well known that any paint, dye, or coloring agent will not penetrate or permeate cork, but will only adhere to its surface. By finely pulverizing it, however, and reducing it to a powder, as before described, the particles of cork are so small that they may be dyed or colored, and thus a mass of uniform and beautiful color of any description can be made.

The product resulting from the process just specified is practically indestructible. It is not affected by moisture, by heat, or by cold. It will not be injuriously affected by stains or dirt. It can readily be cleaned. Formed into blocks or plates of suitable shape or pattern, it may be attached to any foundation in the production of marquetry-work. It can be pressed to any degree of solidity, from a soft elastic velvety mass to a hard ivory-like consistency. As a non-conductor of heat or cold and of sound its use in the construction of floors or partition-walls is apparent. It is also suitable as a substance from which to make an infinite variety of devices, such as are now made from celluloid or hard rubber. It is, moreover, cheaper of construction than either celluloid or hard rubber, and it may be employed for many purposes to which these substances are not adapted, such as flooring and wall-covering, already mentioned.

In case a product designed to have a glazed or polished surface is to be made, an addition to the mass of varnish or of some substance susceptible of taking a polish would be required, and this would be comprehended within my invention.

The drawings herewith accompanying represent a few of an indefinite number and variety of things that can be made from cork prepared according to my invention.

In Figure 1 is represented an ornamental border suitable for floor-covering, tables, and the like, said bordering composed of vari-colored cork. Fig. 2 represents, in plan view, a button, and Fig. 3 represents, in side elevation, a door-knob, each of which could be formed from cork, as above specified; and Fig. 4 represents a layer of my prepared cork upon a foundation of fabric.

What I claim is—

1. A solid mass consisting of finely powdered or pulverized cork and a suitable binder, substantially as shown.

2. A mass consisting of finely powdered or pulverized cork and a coloring agent or substance mixed with a suitable binder, united, and pressed to a solid consistency, substantially as shown.

3. Any article of manufacture, such as a toy, ornament, implement, or anything formed from finely powdered or pulverized cork mixed with a suitable binder, (colored or not,) and solidified by pressure, substantially as shown.

4. A mass consisting of pulverized or powdered cork, (of natural or artificial color,) mixed with a suitable binder and with any suitable substance susceptible of taking a polish, the whole solidified by pressure, substantially as shown.

In testimony whereof I have signed my name to this specification in the presence of two subscribing witnesses.

JOHN L. POPE.

Witnesses:
WILLARD FRACKER,
JNO. CROWELL, Jr.